Patented Oct. 17, 1933

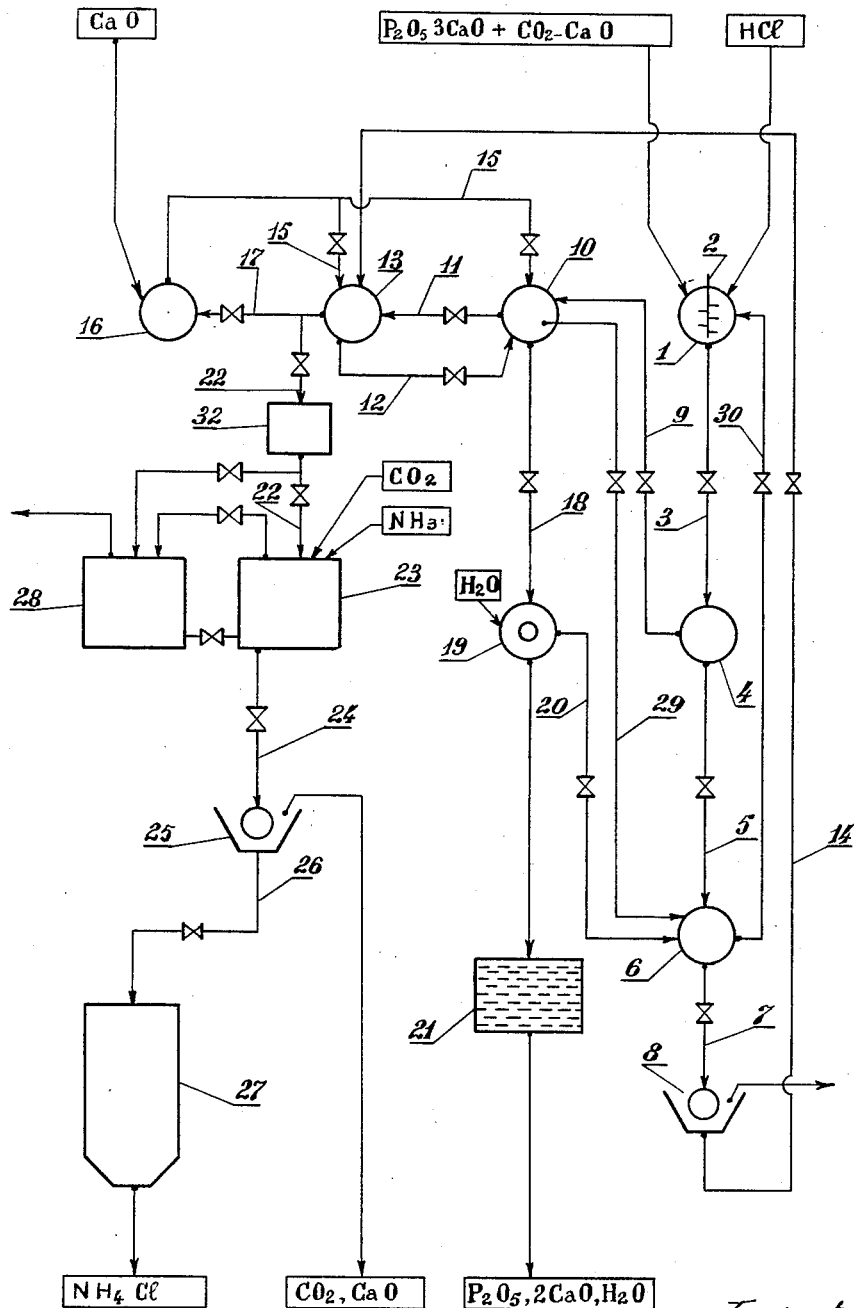

1,930,744

UNITED STATES PATENT OFFICE 1,930,744

PROCESS FOR THE SIMULTANEOUS MANUFACTURE OF DICALCIUM PHOSPHATE AND OF AMMONIUM CHLORIDE

Louis Durepaire, Epinay-Sur-Seine, and Bernard Quanquin, Grand-Couronne, France

Application June 28, 1932, Serial No. 619,802, and in France July 6, 1931

3 Claims. (Cl. 23—109)

The process for the manufacture of dicalcium phosphate from the natural tricalcium phosphates, by treating such natural phosphates with hydrochloric acid and then with lime, is already known.

The natural phosphates contain a rather large proportion of impurities, and chiefly calcium carbonate, and these may be considered roughly as having the formula $(P_2O_5, 3CaO+CO_2, CaO)$. The manufacture of the dicalcium phosphate by this known method may be represented by the following equations:

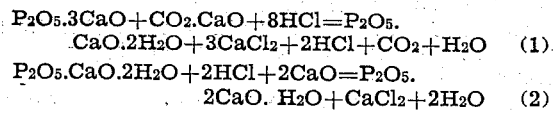

This will afford, for each molecule of dicalcium phosphate $(P_2O_5, 2CaO, H_2O)$, four molecules of calcium chloride $CaCl_2$, which have hitherto been discarded as of no value, and thus, in spite of the low price of the hydrochloric acid, the said operation is hardly remunerative.

The present invention has for its object to afford an industrial utilization of the calcium chloride as produced by the aforesaid operations, by forming ammonium chloride and calcium carbonate by means of ammonia, and these products may be used either separately or mixed together, in order to form a fertilizer of good quality. The reaction, which is well known, may be written as follows:

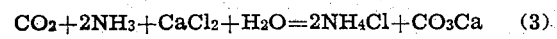

This reaction is complete, due to the almost absolute insolubility of the calcium carbonate, which is precipitated as fast as it is formed.

The ammonium chloride remains in solution, and is crystallized by evaporation.

It is advantageous, due to this evaporation, that the solutions under treatment should be quite concentrated as concerns the calcium chloride, $CaCl_2$ and the present invention comprises for this purpose a process for the manufacture of dicalcium phosphate, employing the known reaction, thus producing a very concentrated solution of calcium chloride which may be treated according to the known reaction (3) in conditions which are sufficiently economical to enable its use on an industrial scale.

The said process consists in the fact that the action of the concentrated hydrochloric acid upon the tricalcium phosphate takes place in a liquid which already contains a large proportion of calcium chloride, $CaCl_2$ (provided by previous reactions).

The precipitation of the dicalcium phosphate from the acid solution of monocalcium phosphate, according to reaction (2) is assured by milk of lime which is prepared by means of the calcium chloride solution.

In this manner, all the water employed in the process may be reduced to the water necessary for the washing of the aforesaid dicalcium phosphate thus extracting therefrom the whole of the calcium chloride which it is able to withdraw. The quantity of water required for such washing is quite limited, in order to make up for the losses of water in the several operations, and chiefly the extraction of the wet sludges, and the evaporation.

In a modified form of the process, the solution of calcium chloride which is treated by carbonic acid and ammonia according to reaction (2) is sufficiently concentrated in order to afford a simultaneous precipitation of the ammonium chloride and the calcium carbonate. The mixture of these two salts will directly produce a fertilizer containing calcium and nitrogen.

The accompanying drawing represents an industrial plant embodying the process in conformity to the invention.

The said plant comprises a tank or vat termed the reaction tank, which is provided with a mechanical stirring device 2; said tank is connected by a conduit 3 with a settling apparatus 4 whose lower part is connected by a conduit 5 with a second settling apparatus 6, connected in turn with a sludge filter 8.

The settling apparatus 4 is connected by an upper conduit 9 with a tank or vat 10 in which the first precipitation is effected, and which is connected in closed circuit, by two conduits 11—12, with a tank 13 in which the second precipitation is effected. A conduit 14 supplies the tank 13 with the part of the liquid which has passed through the filter 8. The two tanks 10 and 13 are further connected by conduits 15 with a tank or vat 16 in which the milk of lime is prepared. A conduit 17 leads from the tank 13 into the tank 16 in order to supply the necessary liquid.

A conduit 18 leads from the tank 10 to a mechanical dryer 19 which is connected (as concerns the separated liquid) by a conduit 20, with the second settling apparatus 6, and as concerns the solid part of the same, with a dryer 21.

The said tank 10 is connected by a conduit 29 with the second settling apparatus 6, which is connected by a conduit 30 with the reaction tank 1.

The conduit 17 for the discharge of the liquids from the tank 13 carries a branch conduit 22 which passes through a heater 32 and thence into a tank 23 (for the conversion of ammonia into carbonate) whose lower part is connected by a conduit 24 with a filter 25 connected by a conduit 26 with an evaporating apparatus 27.

The said tank 23 for ammonia treatment operates in parallel with a similar tank 28.

The operation of the said plant is as follows:

The tank 1 containing a calcium chloride solution, obtained from the preceding operations, is supplied with natural tricalcium phosphate $P_2O_5 \cdot 3CaO + CO_2CaO$, and with hydrochloric acid HCl, and the reaction takes place, stirring the while by means of the stirring device 2.

When the reaction has ended, the whole contents are circulated through the conduit 3 into tank 4 and the solid products obtained in this latter are brought by the conduit 5 to tank 6 which is supplied by conduits 20—29 with the residual liquids from the tank 10 and dryer 19. The solid substances (or sludges) are brought by conduit 7 to the filter 8, and the liquid, consisting herein of calcium chloride, is circulated through the conduit 30 into the reaction tank 1, in which a succeeding operation takes place.

The solid substances collected on the filter 8 are sludges without value, and are discharged. The liquid is returned to the cycle by the conduit 14 which leads to the tank 13 for the second precipitation.

The clear liquid obtained from the first settling apparatus 4 contains chloride of calcium, monocalcium phosphate and an excess of hydrochloric acid. These are brought by the conduit 9 into the tank used for the first precipitation 10, into which the conduit 15 delivers a milk of lime which is formed in the tank 16 by the addition of lime, CaO, to solutions brought by the conduit 17.

The tank for the first precipitation 10 is also supplied, by the conduit 12, with the dicalcium phosphate previously precipitated in the tank 13; this phosphate is dissolved in the acid liquid delivered by the conduit 9. The milk of lime supplied by the conduit 15 precipitates dicalcium phosphate, and this is brought by the conduit 18 to the dryer 19 which removes the liquids and circulates them, as above stated, to the second settling apparatus 6, whilst the solid products are washed by the addition of water, $H_2O$, and are then delivered to the dryer 21, from which the dicalcium issues and is then ready for use.

A part of the clear liquid of the tank 10 is taken off by the conduit 29 for operating the second settling apparatus 6; the other part is sent into the tank 13 which is supplied with milk of lime by the conduit 15; at the same time, the conduit 14 supplies the liquid from the filter 8. The tank 13 delivers, as above stated, the precipitated dicalcium phosphate through the conduit 12 into the tank 10.

A part of the calcium chloride solution from the tank 13 is circulated through the conduit 17 into the tank serving to prepare the milk of lime; the other part is brought through the conduit 22 into the first carbonate and ammonia treating tank 23 through which is circulated, by bubbling, ammonia gas $NH_3$ and carbon dioxide $CO_2$. Before entering the tank 23, the calcium chloride solution is heated in the apparatus 32 to a temperature of about 45° C.

The ammonia gas is brought into the tank 23 to an amount corresponding to the chloride contained in the solution, with a slight excess. A certain pressure is produced in the tank 23, corresponding to the tension of the water vapour at the temperature of the operation, to which is added the partial pressure of the ammoniacal liquid at the same temperature. This liquid is then supplied with carbon dioxide gas; an excess of 75% is suitable (it is feasible to use for this purpose industrial smoke or fumes containing 10 to 15% of carbon dioxide $CO_2$). The calcium carbonate is thus precipitated.

The temperature of 45 degrees is the lowest that is favourable to the formation of a precipitate of calcium carbonate which can be readily filtered. The excess of gas in the tank 23 is sent into the tank 28 in which they enter into contact with a fresh solution of calcium chloride brought by the conduit 22, after which the excess of gas escapes into the atmosphere.

In a subsequent carbonate treatment, there is used in the tank 23 the ammoniacal liquid brought from tank 28, and thus the whole of the ammonia is recovered.

From the outlet of the tank 23, the liquid containing the ammonium chloride and the calcium carbonate precipitate is brought to the filter 25 which removes the calcium carbonate $CO_2CaO$ and allows the liquid to proceed through the conduit 26 into the evaporating apparatus 27 in which the ammonium chloride $NH_4Cl$ crystallizes and can be collected.

The said plant is particularly applicable for the treatment of Morocco phosphate by hydrochloric acid at 21° Bé.

By effecting the action and the precipitation in proper conditions of duration, dilution, excess of acid, and amount of lime in the milk of lime, it is possible to maintain a strength for the liquids in circulation of 300 grams of calcium chloride per litre, without employing operations which are practically more complicated than are used in the known manufacture of dicalcium phosphate, and this affords a dicalcium phosphate of an excellent quality.

By the use of a calcium chloride solution of this strength, it is feasible to obtain, by the aforesaid means, a rather concentrated solution of ammonium chloride, or 300 grams per litre, in order that the salt may be removed at a small expense for evaporation in the apparatus 27.

The said invention is not limited to the process herein set forth, not to the plant above described. With other natural phosphates and other strengths of hydrochloric acid, the arrangement for the circulation of the liquids will be modified. For instance the washing will be effected in the second settling apparatus 6 by means of the residual liquid from the second precipitating tank 13 and not with the liquid from the tank 10, or again, the liquid will be brought from the filter 8 to tank 10 instead of to the tank 13.

The liquid separated in the dryer 19 may be circulated into the tank 1 or into tanks 10 and 13.

The filter 25 might be eliminated, thus proceeding with a simultaneous precipitation of calcium carbonate and ammonium chloride. The resulting product will thus form an excellent fertilizer.

We claim:

1. A process of preparing dicalcium phosphate consisting in treating natural tricalcium phosphate with hydrochloric acid in the presence of a concentrated solution of calcium chloride obtained from the mother liquors of a preceding operation, adding milk of lime to the mixture, separating dicalcium phosphate as the principal product, recovering the remaining solution of concentrated calcium chloride, decomposing a part of this calcium chloride by reacting the same with ammonia and carbon dioxide, recovering as secondary products ammonium chloride and calcium carbonate, and utilizing the mother liquors containing the rest of the calcium chloride for a new cycle of operation.

2. A process of preparing dicalcium phosphate consisting in treating natural tricalcium phosphate with hydrochloric acid in the presence of a concentrated solution of calcium chloride obtained from the mother liquors of a preceding operation, treating the mixture with milk of lime formed of lime and a solution of calcium chloride separated from the mother liquors of a preceding operation, separating dicalcium phosphate as the principal product, recovering the remaining solution of concentrated calcium chloride, decomposing a part of this calcium chloride by reacting the same with ammonia and carbon dioxide, recovering as secondary products ammonium chloride and calcium carbonate, and utilizing the mother liquors containing the rest of the calcium chloride for a new cycle of operation.

3. A process of preparing dicalcium phosphate consisting in treating natural tricalcium phosphate with hydrochloric acid in the presence of a concentrated solution of calcium chloride obtained from the mother liquors of a preceding operation, washing the sludge from the impurities of natural tricalcium phosphate with a solution of calcium chloride separated from the mother liquors of a preceding operation, adding the washing solution to the mixture of tricalcium phosphate and hydrochloric acid, treating the mixture with milk of lime, separating dicalcium phosphate as the principal product, recovering the remaining solution of concentrated calcium chloride, decomposing a part of this calcium chloride by reacting the same with ammonia and carbon dioxide, recovering as secondary products ammonium chloride and calcium carbonate, and utilizing the mother liquors containing the rest of the calcium chloride for a new cycle of operation.

LOUIS DUREPAIRE.
BERNARD QUANQUIN.